Figure 1:
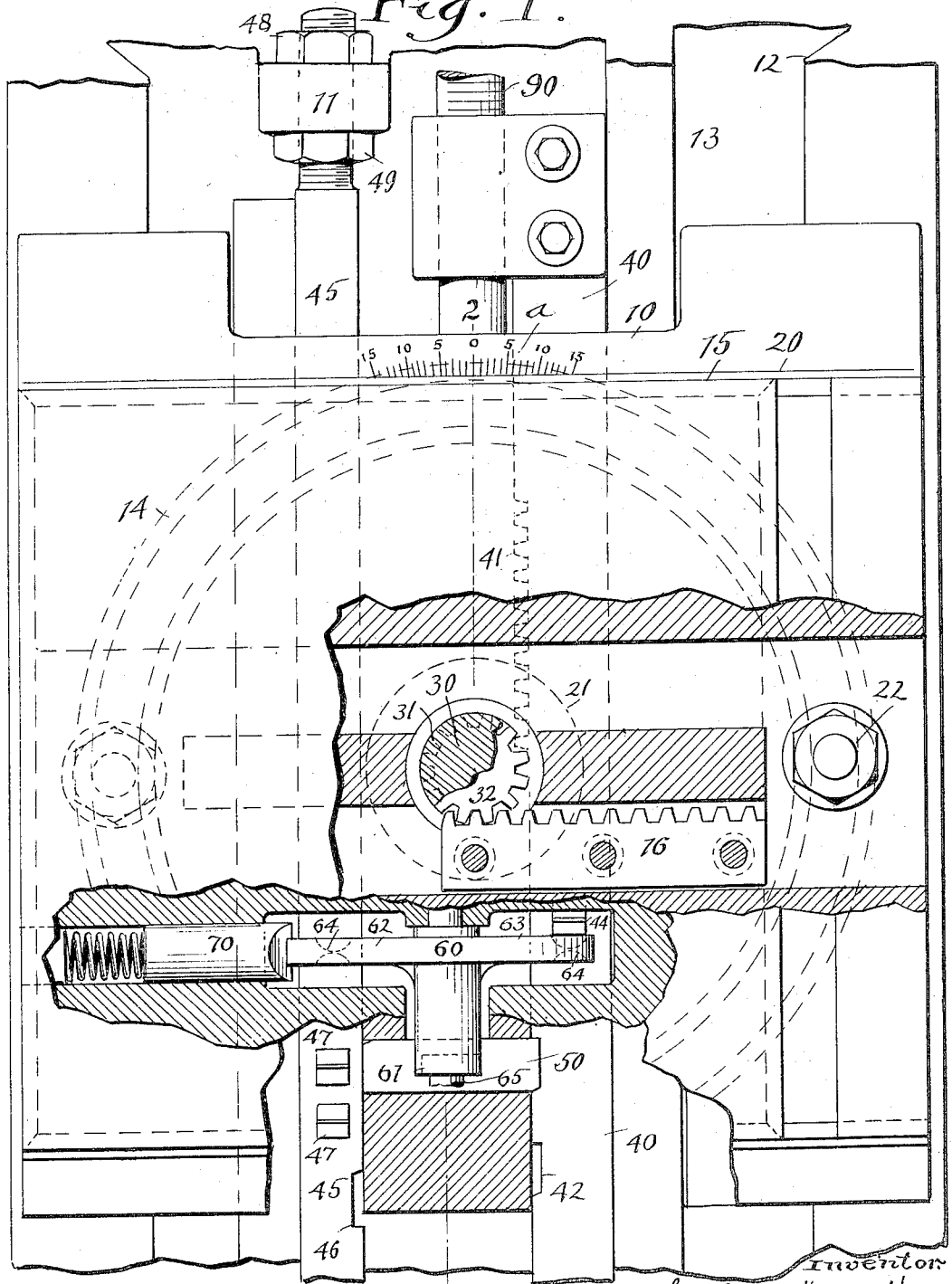

Patented Mar. 27, 1923.

1,449,463

UNITED STATES PATENT OFFICE.

JOHN J. N. VAN HAMERSVELD, OF CLEVELAND, AND GEORGE W. DRAKE, OF CLEVELAND HEIGHTS, OHIO, ASSIGNORS TO THE WARNER AND SWASEY COMPANY, OF CLEVELAND, OHIO, A CORPORATION OF OHIO.

TOOL-SLIDE MECHANISM.

Application filed November 15, 1920. Serial No. 424,137.

*To all whom it may concern:*

Be it known that we, JOHN J. N. VAN HAMERSVELD and GEORGE W. DRAKE, citizens of the United States, and residents, respectively, of Cleveland, in the county of Cuyahoga and State of Ohio, and Cleveland Heights, in the county of Cuyahoga and State of Ohio, have invented a certain new and useful Improvement in Tool-Slide Mechanism, of which the following is a full, clear, and exact description.

This invention relates to tool holding mechanism adapted for use in the kind of machine tools in which the work piece to be cut is carried by a revolving spindle, and the tool is moved in the proper direction or directions to cut the work piece as required.

The invention, as exemplified in the drawing, is organized with special reference to its use in and as a part of a multiple spindle chucking machine; that is to say, a machine in which there are a plurality of parallel work holding spindles rotatably mounted on a turret,—said turret being associated with indexing mechanism by which the turret is periodically turned through a definite arc to bring the spindles successively into working relation with a plurality of tools. In such machines like work pieces are successively secured to the several spindles, while each is in the so-called loading station. Each of these work pieces is successively carried to and is operated upon by all of the tools in the machine; and simultaneously all of the tools of the machine are operating upon those work pieces which are secured to the spindles then in operative relation with the tools.

In such a machine it is especially desirable that the various tools be endowed with the capacity for moving and cutting not only in directions parallel with the axis of the work spindles, but in directions transverse thereto; and it is of course desirable that the tools shall automatically change their direction of motion at the exact point along the work where such change is necessary.

The object of the present invention is to provide tool holding mechanism adapted for use in machines of this character, and which may be made to automatically change their direction of motion in accordance with the particular requirements of the work which the tool is required to operate upon, and the invention consists in the construction and combination of parts shown in the drawings and hereinafter described and pointed out definitely in the appended claims.

Figure 2:
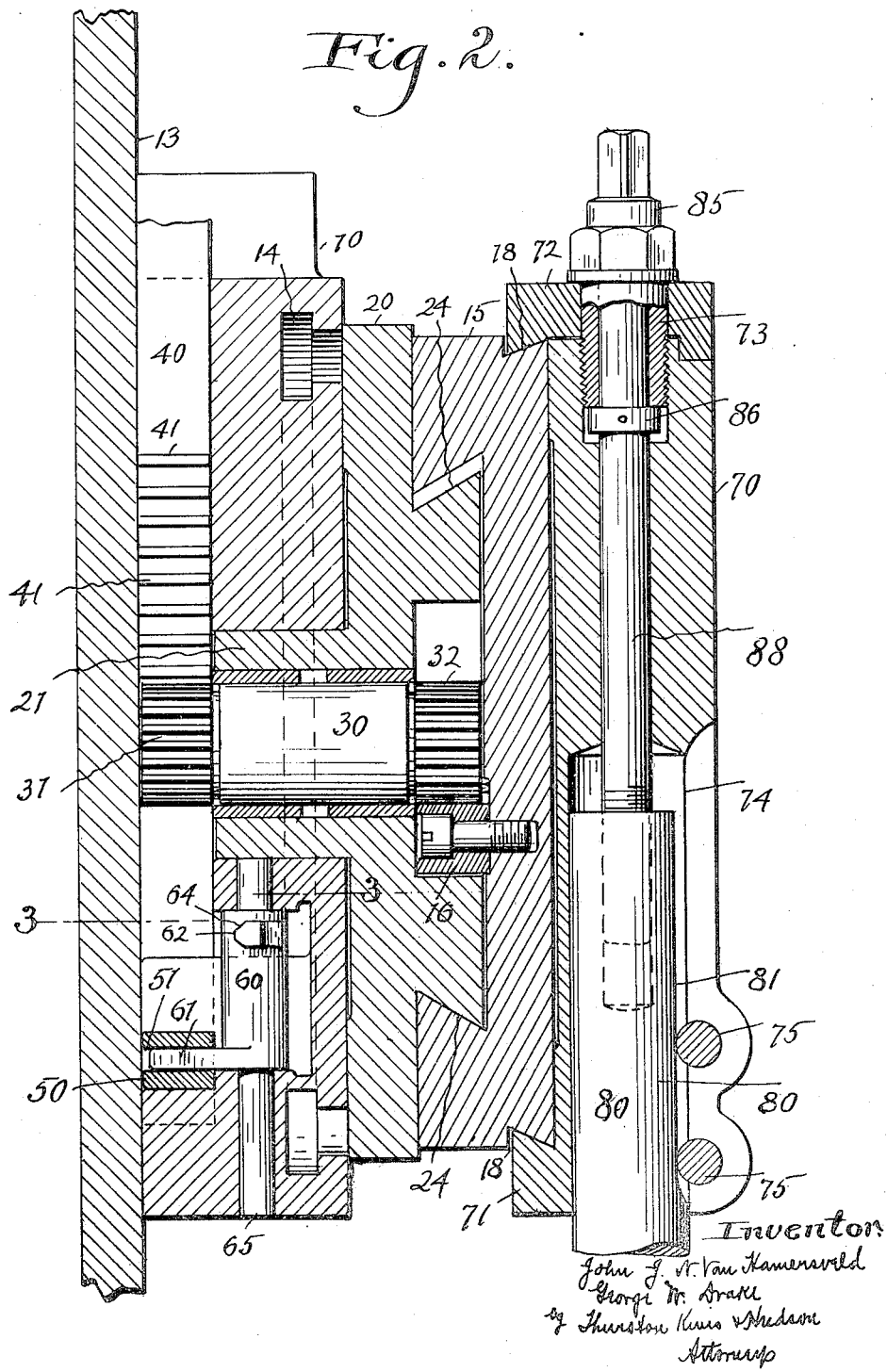
Figure 3:
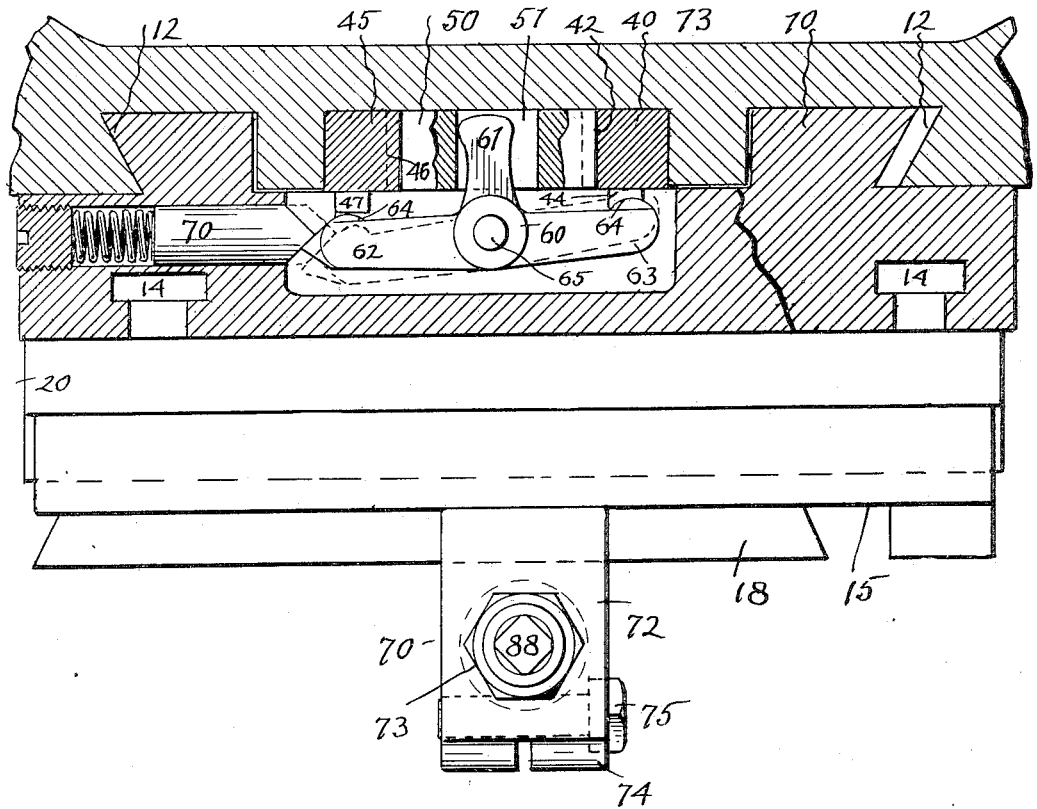
Figure 8:
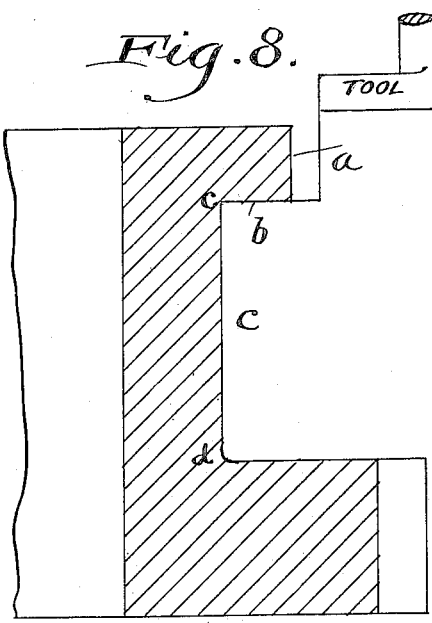

In the drawings, Fig. 1 is a front elevation, partly broken away and sectioned, of the tool slide mechanism in which the present invention is embodied,—the tool holder being omitted; Fig. 2 is a vertical section in the plane of line 2—2 on Fig. 1; and Fig. 3 is a horizontal section in the plane indicated by line 3—3 on Fig. 2; Figs. 4 to 7 inclusive are diagrammatic views which show the relative positions of the main rack bar 40, the adjustable bar 46, and the lock bolt mechanism, and of course, the slide which carries the lock bolt mechanism at various points in the downward movement of the rack bar. Fig. 8 is a sectional view through one half of a piece of work having three surfaces, *a*, *b*, *c*, which may be automatically cut by the tool during a single downward movement of the main rack bar when the parts are formed substantially as shown in Figs. 4 to 7.

Referring to the parts by reference characters, 10 represents the main tool slide which is mounted to slide in a direction which is parallel with the associated work holding spindle in certain guideways 12 on a portion of the machine frame 13. 15 indicates a cross slide, to which the tool 30 is to be secured. This cross slide is supported on the main slide, and may move in unison with it, or it may have an independent movement upon the main slide. In the specific construction shown the cross slide is directly supported upon a cross slide carrier or swivel, 20, which is rotatably mounted on the main slide on an axis at right angles to the plane in which the main slide moves. Specifically this cross slide carrier is provided on its rear face with an integral cylindrical boss 21, which is rotatably mounted in a corresponding hole in the main tool slide. This cross slide carrier has on its outer face guideways 24 which support the cross slide 15. The cross slide carrier carries bolts 22 whose heads enter arc-shaped grooves 14 in the outer face of the main slide. These bolts are for the purpose of rigidly fastening the cross slide carrier to the main slide in such position that the cross slide guides thereon extend in the desired direction. Obviously by the adjustment of this cross slide carrier these guideways for the cross slide may occupy a horizontal position, or may be turned so as to occupy any desired angular relation to the horizontal. The front face of the main slide is graduated as at $a$ (see Fig. 1) to enable one to accurately determine the angular position of the cross slide guideways.

A shaft 30 is rotatably supported by the main slide. Specifically it has its bearings in an axial hole through the cross slide carrier 20 and the cylindrical boss 21 thereof. On the back end of this shaft a pinion 31 is fixed. Another pinion 32 is fixed to the front end of this shaft. The cross slide carries a rack bar 16 which is in constant mesh with this last named pinion. The other pinion is constantly in mesh with rack teeth 41 on one edge of the main rack bar 40. This bar 40 is the prime mover of the tool slide mechanism. It receives its motion from the machine. For example, it may be adjustably clamped to an endwise movable operating bar 90 which is a part of the machine and has a definite path of up and down movement. It is movable endwise in a guided path which is parallel with the path in which the main slide must move. This bar 40 may be moved by any suitable mechanism in guideways provided for it.

It is obvious that if the main slide is locked to this main rack bar 40 the two must move in unison; and therefore there can be no rotation of the shaft 30, and consequently no movement of the cross slide relative to the main slide. If, however, the main slide is disconnected from the main rack bar 40, and is locked to some fixture, then, as the main rack bar moves up or down it will turn the shaft 30, and thereby the cross slide will be compelled to move in one direction or the other.

The main slide carries near its lower end a transversely movable lock bolt 50 which may project at either end from the main slide. This bolt is so located that at one end it is opposite one vertical face of the main rack bar 40 in which may be one or more notches 42, into which said bolt may project to thereby lock the main slide to said rack bar. The other end of the bolt is opposite the face of an adjustable bar 45 in which also is a notch 46 or one or more notches into which said bolt may project, when it has been withdrawn from its engagement with the main rack bar. This adjustable bar 45 is a fixture while the slide mechanism is in operation, although it may be adjusted up or down as required, as will be presently explained. The bolt 50, therefore, either connects the main slide with a fixture, as when it projects into a notch in the adjustable bar, or it may connect the slide to the main rack bar, as when its end projects in a notch in said bar. When the bolt projects into a notch in either of these bars its other end is in position to engage the unnotched face of the other bar, and thereby the bolt is prevented from being withdrawn from the notch into which its end is projecting.

An automatic bolt shifter 60 is mounted on the main slide. It is pivoted on a vertical stud 65, and is provided with three arms. One of these arms 61 projects into a long hole 51 in the bolt. The other two arms 62, 63, project in opposite substantially horizontal directions from the pivot of the shifter, and lie close to the front faces of the adjustable bar 45 and the main rack bar 40. One arm of this bolt shifter likewise is in position to be engaged by the beveled end of the spring actuated plunger 70 which is mounted in a guide hole on the main slide. On the front face of the adjustable bar 45 are one or more forwardly projecting V shaped lugs 47. In fact, there may be as many of these lugs as circumstances require, as will be presently explained, and they may be fixed or adjustable as desired. Each of these lugs is so placed that it may be engaged by a beveled surface 64 on the opposed face of the adjacent arm of the bolt shifter. Similar V-shaped lugs 44, one or more, are provided on the front face of the main rack bar 40 in operative relation with a beveled surface 64 on the adjacent arm of the bolt shifter. These parts act automatically to impose upon the bolt a tendency to move out of the position in which it may chance to be, and into the opposite position whenever the circumstances will permit.

The rack bar 40 and adjustable bar are provided with notches and beveled lugs which automatically cause a tool secured to the cross slide to move down then crosswise, and then down again at such times and for such distances as will enable the tool to finish the surfaces $a$, $b$ and $c$ on the work piece shown in Fig. 8.

Figure 4:
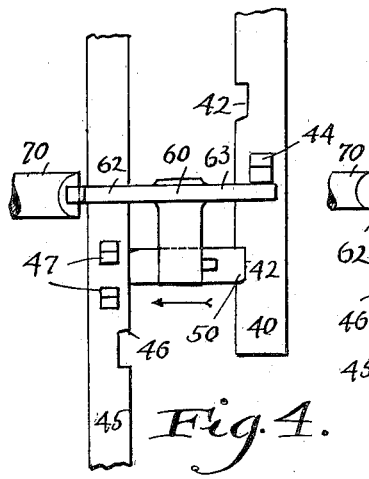

The operation and timing of the lock bolt mechanism is as follows, reference being had to Figs. 4 to 8, inclusive. Fig. 4 shows the position of the parts when the main rack bar is about to begin its downward movement. The lock bolt 50 is engaging a notch 42 in the main rack bar 40, and consequently, as the main rack bar goes down, the main slide must go down with it. As the slide moves down the arm 62 of the bolt shifter engages the upper beveled lug 47 on the adjustable bar and rocks the bolt shifter so as to carry the end of the arm 62 over the point of the spring plunger 70. The spring plunger now exerts upon the bolt shifter yielding force by which the bolt is yieldingly pressed against the face of the adjustable bar 45; and therefore this bolt snaps into the notch 46 in said adjustable bar as soon as the bolt comes opposite that notch. The main slide has now become locked to a fixture, but the main rack bar 40 continues its downward movement and thereby carries the beveled lug 44 on its face into engagement with the arm 63 of the bolt shifter and rocks said arm far enough to carry the end of the arm 62 thereof over the point of the spring plunger, thereupon the spring plunger acts through the bolt shifter to yieldingly press the bolt against the face of the main rack bar.

Figure 5:
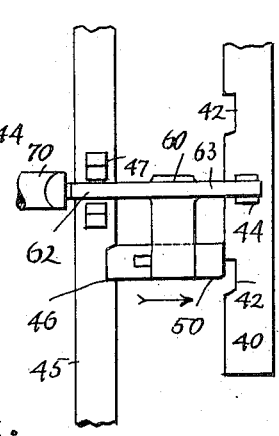
Figure 6:
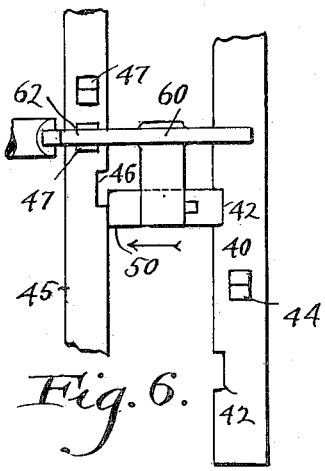
Figure 7:
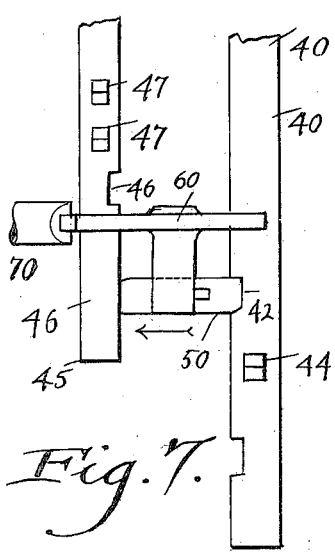

The parts are now in the relative position shown in Fig. 5, and the bolt continues to have this tendency to move to the right until, as the main rack bar 40 continues to descend, a notch 42 therein comes opposite the end of the bolt and the bolt flies into that notch. So long as the bolt was locking the main slide to the adjustable bar the cross slide was being moved crosswise by the mechanism previously described. As soon, however, as the bolt slips into the notch in the main rack bar the main slide becomes locked to the rack bar again and goes down with it, reaching finally the position shown in Fig. 7. During this downward movement the arm 62 of the bolt shifter is engaged by the lower beveled lug 47 on the adjustable bar, as shown in Fig. 6, and thereby the bolt shifter arm 62 is carried past the point of the spring plunger, which then acts upon the bolt shifter with the result of applying yielding pressure to the bolt tending to push it to the left and hold it in engagement with the adjustable bar; and to slip into the notch 46 of said adjustable bar when the end of a bolt comes opposite the same. Fig. 8 has as stated three surfaces which may be turned by a tool carried by the cross slide when the slide mechanism and the automatic bolt shifting mechanism are constructed substantially as shown.

During the first part of the downward movement of the rack bar and while the main slide is connected therewith the tool may cut the work piece down to surface $a$ as shown in Fig. 8. When it has completed cutting this surface the lock bolt will slip into a notch 46 in the adjustable bar and thereupon the slide will carry the tool crosswise and it may cut the work down to the surface $b$. When this has been completed the main rack will have arrived at a point where a lock bolt will slip into an upper notch therein and connect the main slide with the main rack bar, wherefore during the remainder of the downward movement of the main slide the tool may cut the work piece down to the surface $c$.

It will be understood, of course, that it is not necessary that the tool shall cut all of these three surfaces during a single downward movement of the main rack bar. In fact, for reasons which will be understood to those familiar with this art, it is preferable that in the first part of the downward movement of the tool slide, the tool shall not cut the work at all, but shall only begin to cut when the tool begins its first horizontal movement in which the work piece will be cut down to the surface $c$. The tool when it changes its direction and moves downward will then cut the work piece down to the surface $c$. The construction, however, is such that by placing notches in the edges of the tool bars 40 and 45, and by properly placing beveled lugs 44 and 47 on these two bars, the bolt may be caused to automatically shift its engagement from one of the bars to the other at the proper times, and as many times as desired, and to change the direction of movement of the tool at each shift of the bolt; and the tool may be adjusted to cut the work piece during any or all of its different movements.

The adjustable bar 45 has a threaded upper end which passes through a lug 11 on the frame; and this bar may be moved up and down and fixed in position by means of this threaded end, and nuts 48 and 49 thereon above and below the lug on the frame. The rack bar 40 likewise may have an adjustable connection with whatever operating part it is connected, as for example, a bar 90 which is moved endwise up and down through a definite path by mechanism that is no part of the present invention, in order that it may be moved endwise to produce the results which have been explained.

The tool holder 70 may be clamped against the outer face of the cross slide at any desired point. The cross slide may have undercut edges 18, one for engagement with the correspondingly shaped lug 71 on the lower edge of the tool holder, and the opposite one for engagement with the correspondingly shaped end of a clamping plate 72, which clamping plate may be moved down relative to the tool holder, so as to clamp the cross slide between it and the lower lug 71 by means of a tubular bolt 73 which passes through the clamping plate and screws into the upper end of the tool holder. On the lower end of the tool holder there is a split tubular socket 74 for the reception of the tool shank 80. The tool shank has a flattened side 81 which will be engaged by bolts 75, whereby the turning of the tool shank will be prevented. These bolts also clamp the split socket 74 upon the tool shank when it is in the desired position. The tool shank has a threaded hole 82 in its upper end. A tool adjusted screw 88 screws into this hole, which screw passes through tubular bolt 73, and has collars 85, 86, which engage the upper and lower ends of said bolt 73. By turning this screw the position of the tool shank may be finely adjusted in the tool holder.

Having described our invention, we claim:

1. In tool slide mechanism, the combination of a main slide, a cross slide supported thereon, a sliding bar, means by which to selectively effect an operative connection between the sliding bar and either of said slides, and means acting automatically at predetermined points in the movement of said sliding bar in one direction to switch the operative connection between the sliding bar and the two slides one or a plurality of times.

2. In a tool slide mechanism, the combination of a main slide, a cross slide supported thereon, a sliding bar, means by which to selectively effect an operative connection between the sliding bar and either of said slides, and means acting automatically at predetermined points in the movement of said sliding bar in one direction to shift the operative connection of the sliding bar from the main slide to the cross slide and back again to the main slide.

3. In a tool slide mechanism, the combination of a main slide, a cross slide supported thereon, a sliding bar, means by which to selectively effect an operative connection between the sliding bar and either of said slides, and means acting automatically at predetermined points in the movement of said sliding bar in one direction to switch the operative connection of the sliding bar from one slide to the other slide and back again to the first mentioned slide.

4. In tool slide mechanism, the combination of a main slide, a cross slide supported thereon, a movable main rack bar for actuating said slides, a rack bar fixed to the cross slide, a pinion device rotatably supported on the main slide in engagement with both racks, and means to successively lock the main slide to the main rack bar, to a fixture and again to the main rack bar during a movement of the latter in one direction.

5. In tool slide mechanism, the combination of a main slide, a cross slide supported thereon, a rack bar fixed to the cross slide, a movable main rack bar, pinion mechanism mounted on the main slide in engagement with both of said rack bars, and means which act automatically to disconnect the main rack bar and main slide and simultaneously lock the main slide to a fixture when the main slide has moved a predetermined distance thereby inducing a movement of the cross slide, and means to automatically release the main slide from said fixture and simultaneously connect it with the main rack bar when the cross slide has moved a predetermined distance all during a movement of the main rack bar in one direction.

6. In tool slide mechanism, the combination of a main slide, a cross slide supported thereon, a rack bar fixed to the cross slide, a movable main rack bar, a pinion device mounted on the main slide in engagement with both of said rack bars, a bolt carried by the main slide there being a notch in the main rack bar for one end of said bolt to engage with, and a notch in a fixture for the other end of said bolt to engage with, and automatic means for moving said bolt first in one direction and then in the other direction to cause it to shift its engagement from one to the other of said notches at predetermined points in the movement of the main rack bar said automatic means including a spring actuated device arranged to throw the bolt alternately in opposite directions.

7. In tool slide mechanism, the combination of a main slide, a cross slide supported thereon, a rack bar fixed to the cross slide, a movable main rack bar having a notch, a pinion device mounted on the main slide in engagement with both of said rack bars, a bar adjustably fixed to the main frame having a bolt receiving notch in its edge, a bolt slidably mounted in the main slide and adapted to project from one side or the other thereof into engagement with a notch in the adjustable bar or into a notch in the main rack bar, a bolt throwing member, and means to automatically apply spring pressure to said bolt throwing member to move it in one direction or the other as required.

8. In tool slide mechanism, the combination of a main slide, a cross slide carrier pivoted to the main slide, means to lock the cross slide carrier to the main slide in any desired position relative thereto, a cross slide supported on said carrier, a rack bar fixed to the cross slide, a movable main rack bar, a shaft mounted on the main slide coaxially with said carrier, two pinions which are fixed to said shaft and which respectively engage the two rack bars, and means to successively connect the main slide with the main rack bar, with a fixture and again with the main rack bar during the movement of the latter in one direction.

9. In tool slide mechanism, the combination of a main slide, a cross slide supported thereon, a rack bar fixed to the cross slide, a movable main rack bar, a shaft mounted on the main slide having pinions in engagement with both of said rack bars, a lock bolt carried by the main rack bar for connecting it with the main rack bar or with a fixture, and means which act automatically at predetermined points in the movement of the main rack bar to move the bolt out of engagement with one of said parts and into engagement with the other one or a plurality of times during the movement of the main rack bar in one direction.

10. In tool slide mechanism, the combination of a main slide, a cross slide supported thereon, a rack bar fixed to the cross slide, a movable main rack bar, a shaft mounted on the main slide having pinions in engagement respectively with said rack bars, a lock bolt carried by the main slide for connecting it with the main rack bar or with a fixture, a bolt shifter, and reversing spring mechanism for selectively moving said bolt shifter in opposite directions.

11. In tool slide mechanism, the combination of a main slide, a cross slide supported thereon, a rack bar fixed to the cross slide, a movable main rack bar, a shaft mounted on the main slide having pinions in engagement respectively with both of said rack bars, a lock bolt carried by the main slide for connecting it with the main rack bar or with a fixture, reversing spring mechanism for actuating said bolt, means located one on the main rack bar and one on a fixture for reversing the direction in which said spring mechanism acts upon the bolt.

12. In tool slide mechanism, the combination of a main slide, a cross slide supported thereon, a rack bar fixed to the cross slide, a movable main rack bar, a shaft mounted on the main slide having pinions in engagement respectively with said rack bars, a lock bolt carried by the main slide for connecting it with the main rack bar or with a fixture, a bolt shifter, reversing spring mechanism for actuating said bolt shifter, two devices one on the main rack bar and one on a fixture for reversing the direction in which the spring mechanism acts upon said bolt shifter.

13. In tool slide mechanism, the combination of a main slide, a cross slide supported thereon, a rack bar fixed to the cross slide, a movable main rack bar, a shaft mounted on the main slide having pinions in engagement with both of said rack bars, a bolt carried by the main slide for connecting it with the main rack bar or with a fixture, a pivoted bolt shifter having an operative engagement with the bolt and having two arms, a spring plunger having a V-shaped end engaging one of said arms, and two devices secured one to the main rack bar and one to a fixture, adapted to respectively engage the two arms of the bolt shifter and rock the bolt shifter far enough to carry the part thereof which engages the plunger past the V-shaped edge of the plunger.

14. In tool slide mechanism, the combination of a main slide, a cross slide supported thereon, a rack bar fixed to the cross slide, a movable main rack bar, a shaft mounted on the main slide having pinions in engagement with both of said racks bars, a bolt carried by the main slide for connecting it with the main rack bar or with a fixture, a pivoted bolt shifter having an operative engagement with the bolt and having two arms, a spring plunger having a V-shaped end engaging one of said arms, an adjustable bar, two devices secured one to the main rack bar and one to said adjustable bar adapted to respectively engage the arms of the bolt shifter and rock it far enough to carry the part thereof which engages said plunger past the V-shaped edge of said plunger.

In testimony whereof, we hereunto affix our signatures.

JOHN J. N. VAN HAMERSVELD.
GEORGE W. DRAKE.